United States Patent [19]
Park et al.

[11] Patent Number: 5,410,595
[45] Date of Patent: Apr. 25, 1995

[54] APPARATUS AND METHOD FOR NOISE REDUCTION FOR A FULL-DUPLEX SPEAKERPHONE OR THE LIKE

[75] Inventors: Sangil Park; Dion M. Funderburk, both of Austin, Tex.

[73] Assignee: Motorola, Inc., Schaumburg, Ill.

[21] Appl. No.: 975,348

[22] Filed: Nov. 12, 1992

[51] Int. Cl.$^6$ .......................................... H04M 9/08
[52] U.S. Cl. ................... 379/410; 379/411; 379/406; 379/202
[58] Field of Search ............... 379/388, 389, 390, 406, 379/410, 411, 202, 203, 204, 205, 206, 412; 370/110.1, 62

[56] References Cited

U.S. PATENT DOCUMENTS

| | | | |
|---|---|---|---|
| 4,499,238 | 5/1984 | Lee et al. | 379/206 |
| 4,564,939 | 1/1986 | Hansen | 379/388 |
| 4,805,215 | 2/1989 | Miller | 379/411 |
| 4,823,382 | 4/1989 | Martinez | 379/411 |
| 4,862,449 | 8/1989 | Hofkens et al. | 379/411 |
| 4,956,838 | 9/1990 | Gilloire et al. | 379/388 |
| 4,965,822 | 10/1990 | Williams | 379/411 |
| 5,050,160 | 9/1991 | Fuda | 379/411 |
| 5,062,102 | 10/1991 | Taguchi | 379/388 |
| 5,164,989 | 11/1992 | Brandman et al. | 379/410 |
| 5,187,741 | 2/1993 | Erving et al. | 379/388 |
| 5,224,094 | 6/1993 | Maher | 379/205 |
| 5,272,695 | 12/1993 | Makino et al. | 379/410 |
| 5,276,678 | 1/1994 | Hendrickson et al. | 379/202 |
| 5,313,498 | 5/1994 | Sano | 375/103 |

OTHER PUBLICATIONS

"On Acoustic-Echo Cancellation Implementation With Multiple Cascadable Adaptive Fir Filter Chips," by Sangil Park & Garth Hillman, Proc. of ICASSP'89, pp. 952–955, Glasgow, Scotland, May 23–25 1989.

"Full-Duplex Speakerphone With Acoustic and Electric Echo-Canceller Utilizing the DSP56200 Cascadable Adaptive FIR Filter Chip," Sangil Park, Proc. of Midcon/90 Tech. Conf. on Electronic & Electrial Tech., Dallas, Tex., Sep. 11–13, 1990.

*Primary Examiner*—James L. Dwyer
*Assistant Examiner*—Scott L. Weaver
*Attorney, Agent, or Firm*—Paul J. Polansky

[57] ABSTRACT

The characteristics of a room in which a speakerphone (20) is located are measured by determining a time between a test signal and its first attack, and a number of sample periods between the first attack and a time when the average power in the echo falls below a threshold. The first-attack time determines a pre-filter delay and the number of sample periods determines a tap length for an adaptive echo-canceling filter (62). In a teleconferencing environment, an annoying initialization sequence is avoided by initializing filter coefficients for each microphone (140), and saving the initial filter coefficients generated thereby in a corresponding nonvolatile memory (104). In response to an off-hook signal, the coefficients are retrieved from the nonvolatile memory (104). During operation, the coefficients are constantly updated. If another microphone (141) is enabled, the stored coefficients corresponding to that microphone (141) are dynamically substituted for the present coefficients.

12 Claims, 5 Drawing Sheets

APPARATUS AND METHOD FOR NOISE REDUCTION FOR A FULL-DUPLEX SPEAKERPHONE OR THE LIKE

FIELD OF THE INVENTION

This invention relates generally to signal processing systems, and more particularly, to signal processing systems for a full-duplex speakerphone or the like.

BACKGROUND OF THE INVENTION

Recent advances in signal processing technology have allowed the development of new products. One product is the full-duplex speakerphone. Prior technology only allowed half-duplex operation because of the proximity between the loudspeaker and the microphone caused positive feedback and echo. However, half-duplex speakerphones are annoying to users because the speakerphone output is muted while the speaker is talking. The party at the other end is unable to interrupt the conversation until the speaker is quiet for a given length of time.

However, signal processing technology is able to measure room acoustics and automatically cancel any echo thereby generated. The signal processor typically uses an adaptive finite impulse response (AFIR) filter whose coefficients are weighted in accordance with the room acoustics. Each AFIR filter coefficient is multiplied by an audio input signal sample which is delayed by a predetermined number of samples from the current input signal sample. For example if the room causes an echo 50 milliseconds (ms.) after an input signal, the AFIR filter coefficients for samples delayed by 50 ms. are set to cancel this echo. Thus, the signal processor is able to cancel out the echo.

However, full-duplex speakerphones using present signal processing technology have noise problems. One problem is that the echo cancellation process produces noise during operation. Since echoes may be generated up to several hundred ms. after the input signal for some environments, full-duplex speakerphones typically must implement very large AFIR filters. For example, full-duplex speakerphones typically require approximately 1000 AFIR filter taps for small rooms. More-complex speakerphone systems, such as teleconferencing systems for larger rooms having multiple microphones and speakers, may require as many as 4000 taps. Since the speakerphones must be able to operate in a variety of environments, they are designed to accommodate environments having high levels of echo. However, noise increases as the numbers of taps increases, resulting in unnecessary noise increases for small room environments.

Another problem is initialization noise, which is more acute for complex systems such as teleconferencing systems. Before normal operation, the system must initialize the AFIR filter coefficients according to the room acoustics to determine all echo paths. After initialization, the coefficients may be continuously updated. A typical teleconferencing system requires five to twenty seconds of initialization upon power up. During this initialization sequence, the loudspeakers broadcast noise, typically white noise, in order to measure the echo characteristics. Another technique generates a chirp signal instead of white noise. The signal processor generates the chirp by rapidly sweeping all the way from a very low frequency to the Nyquist frequency. Either type of initialization is very annoying to users. Furthermore, the user cannot keep the system continually operational because the adaptive echo cancellation filter coefficients diverge from optimum during long periods of silence.

SUMMARY OF THE INVENTION

Accordingly, there is provided, in one form, an apparatus for noise reduction for full-duplex communication, comprising a summing device, a delay buffer, and an adaptive finite impulse response (AFIR) filter. The summing device has a positive input for receiving a microphone input signal, a negative input, and an output for providing an output signal. The delay buffer has an input for receiving a digital receive path signal, and an output. The AFIR filter has a signal input coupled to the output of the delay buffer, a feedback input coupled to the output of the summing device, and an output coupled to the negative input of the summing device. The delay buffer delays the digital receive path signal by a first predetermined number of sample periods. The first predetermined number of sample periods is equal to a number of sample periods from a test loudspeaker output signal to a first time when a power of the digital microphone input signal exceeds a first predetermined threshold. The AFIR filter has a number of coefficients equal to a number of sample periods between the first time and a second time at which an expected power of the microphone input signal drops below a second predetermined threshold. The AFIR filter has a plurality of contiguous memory locations for storing successive samples of the output of the delay buffer. The AFIR filter multiplies the number of coefficients by corresponding ones of the successive samples of the output of the delay buffer to obtain the output of the AFIR filter.

In another form, there is provided a method for noise reduction for a full-duplex speakerphone or the like. A test output signal is provided through a loudspeaker of the full-duplex speakerphone at a first sample point. An input from a microphone of the full-duplex speakerphone is sampled at a predetermined frequency for a predetermined number of samples. A first number of samples between the first sample point and a second sample point is counted. The second sample point occurs when a power of the sampled input signal is greater than a first predetermined threshold. A second number of samples between the first sample point and a third sample point is counted. The third sample point occurs when an expected power of the sampled input signal is less than a predetermined threshold. The sampled input signal is continuously filtered after the predetermined number of samples with an adaptive finite impulse response (AFIR) filter. The AFIR filter delays an output signal by the first number. The AFIR filter has the second number of taps.

These and other features and advantages will be more clearly understood from the following detailed description taken in conjunction with the accompanying drawings.

DETAILED DESCRIPTION OF A PREFERRED EMBODIMENT

Figure 1:
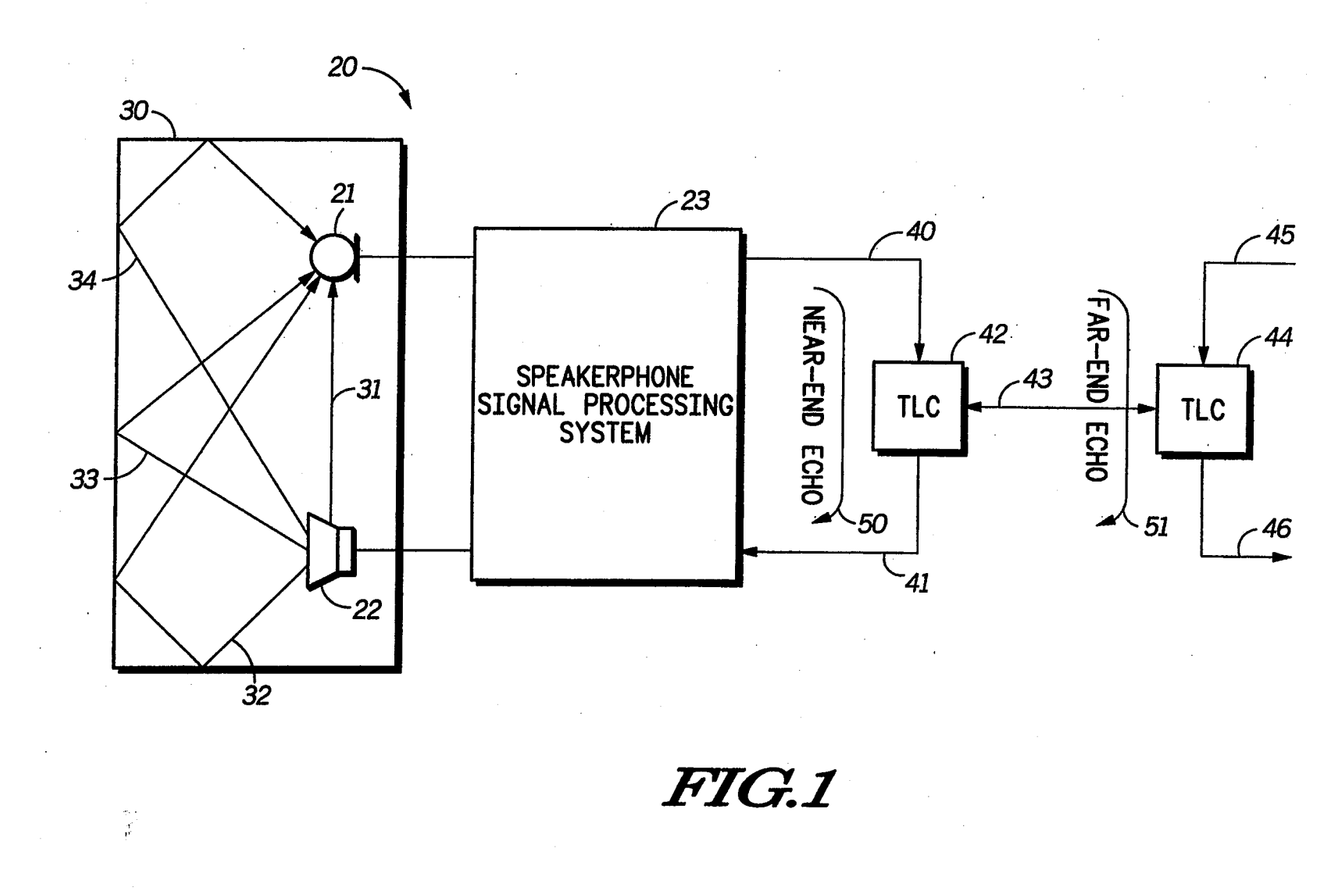
FIG. 1 illustrates in partial block diagram and partial schematic form a signal processing system for a full-duplex speakerphone or the like in accordance with the present invention.

FIG. I illustrates in partial block diagram and partial schematic form a signal processing system 23 for a full-duplex speakerphone 20 or the like in accordance with the present invention. FIG. 1 illustrates the various sources of echo encountered by such a system. Full-duplex speakerphone 20 includes a microphone 21 and a loudspeaker 22 physically located within a room 30 and each coupled to a speakerphone signal processing system 23. Speakerphone signal processing system 23 forms the remainder of the speakerphone and is connected to a near-end four-wire transmission line including two wires forming a transmit interface 40 and two wires forming a receive interface 41. The near-end four-wire transmission line in turn is connected to two-wire transmission line 43 via a transmission line coupler ("TLC") 42. Another TLC 44 connects the other end of two-wire transmission line 43 to a far-end four-wire transmission line which includes two wires forming a transmit interface 45 and two wires forming a receive interface 46.

Full-duplex speakerphone 20 encounters two types of echo. The first type, known as electrical echo, is generated by the two-wire/four-wire interfaces formed by TLCs 42 and 44. A first echo 50, generated by TLC 42, is known as the near-end echo. A second echo 51, generated by TLC 44, is known as the far-end echo. Each electrical echo returns very quickly to speakerphone 20 and thus signal processing system 23 need only implement AFIR filters having relatively small numbers of taps to cancel these echoes.

A second type of echo is acoustic echo. Acoustic echo is generated by the room acoustics as the sound echoes off physical objects such as walls. Acoustic echo differs from electrical echo in that there are multiple echo paths. In room 30, four echo paths 31–34 are illustrated, but many more echo paths are generated. Echo path 31, known as the "first attack" path, represents the shortest distance from loudspeaker 22 to microphone 21. Acoustic echo also differs from electrical echo because its duration is much longer. Depending on such factors as room size and building materials, an acoustic echo may not dissipate for 300 ms. or longer. Thus, larger AFIR filters are required for acoustic echo cancellation than for electrical echo cancellation.

Figure 2:
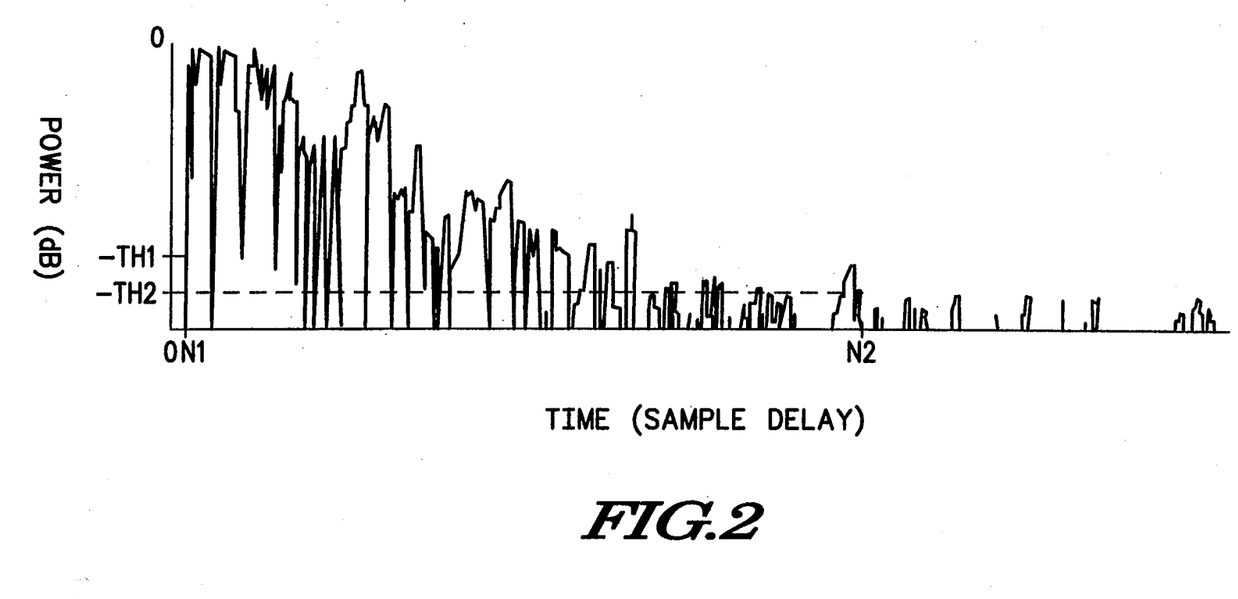
FIG. 2 illustrates a time-domain power plot for the acoustic echo received by the speakerphone of FIG. 1.

FIG. 2 illustrates a time-domain power plot for the acoustic echo received by the speakerphone of FIG. 1. In FIG. 2, the horizontal axis represents time measured in sample periods, and the vertical axis represents power measured in decibels (dB). Time 0 represents an acoustic stimulus such as a voice spoken in the room or a test signal. At a time represented by "N1" sample periods, the microphone receives the first attack. The first attack represents the point in time at which the echo exceeds a first threshold labelled "−TH1" dB. Subsequently, the power in the acoustic signal received by microphone 21 varies in response to the various echo paths in the room. Over time, the acoustical signal dies out, until at a time represented by "N2" sample periods, the acoustical signal falls below a second threshold labelled "−TH2" dB. In a preferred embodiment, (−TH1=−TH2) but the first and second thresholds need not be equal. A typical size for N1 is 30 samples while a typical size for N2 is 1000 samples using −TH1=−TH2=−35 dB. However, these numbers may vary over several orders of magnitude depending on room acoustics.

Figure 3:
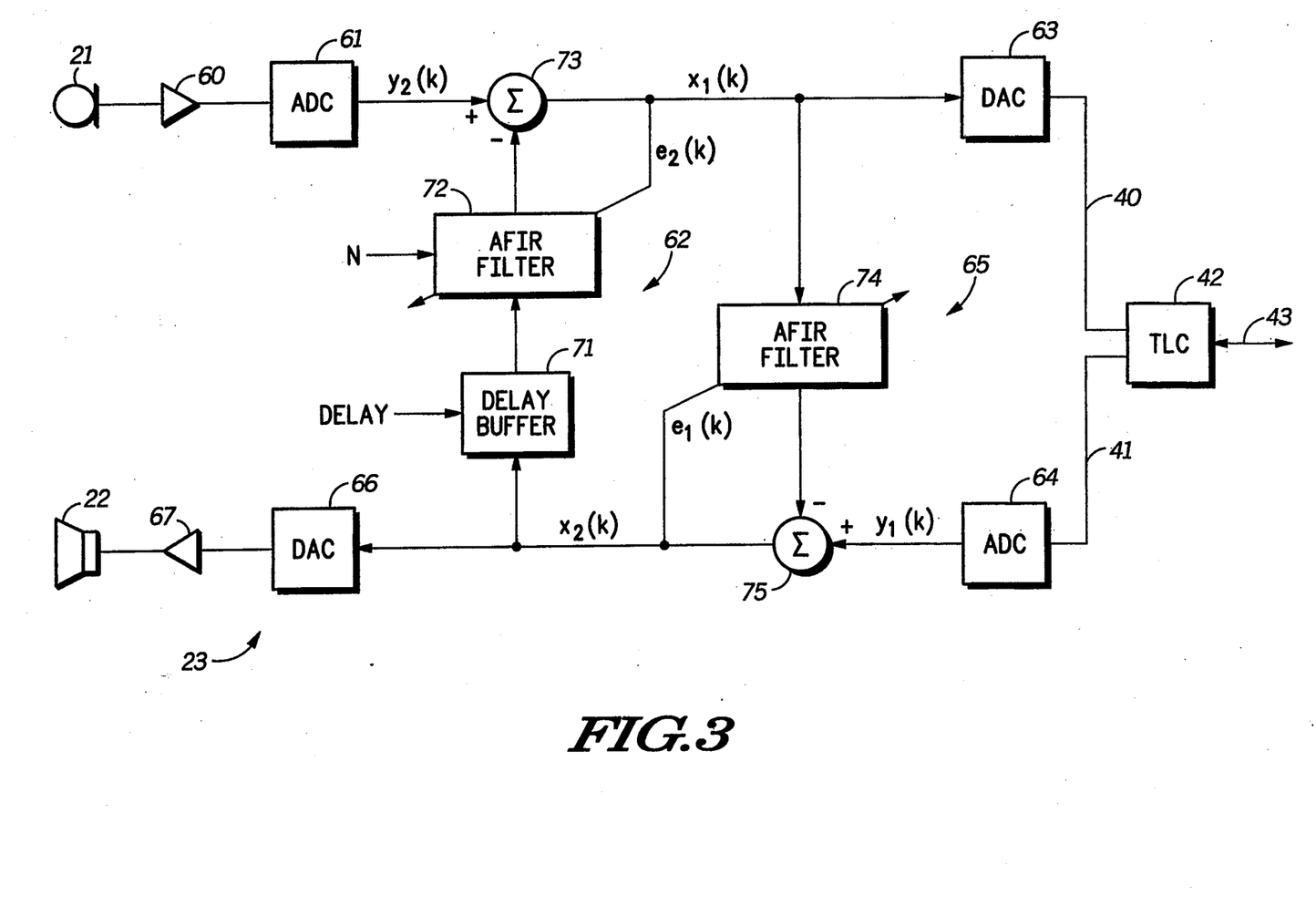
FIG. 3 illustrates in partial block diagram and partial schematic diagram form the signal processing system of FIG. 1.

FIG. 3 illustrates in partial block diagram and partial schematic diagram form signal processing system 23 of FIG. 1. FIG. 3 also illustrates microphone 21, loudspeaker 22, interfaces 40 and 41, TLC 42, and two-wire transmission line 43. Signal processing system 23 includes generally an amplifier 60, an analog-to-digital converter (ADC) 61, an acoustic echo canceller 62, a digital-to-analog converter (DAC) 63, an ADC 64, an electrical echo canceller 65, a DAC 66, and an amplifier 67. Amplifier 60 has an input connected to microphone 21, and an output. ADC 61 has an input connected to the output of amplifier 60, and an output for providing a signal labelled "$y_2(k)$". Acoustic echo canceller 62 includes a delay buffer 71, an adaptive finite impulse response (AFIR) filter 72, and a summing device 73. Summing device 73 has a positive input connected to the output of ADC 61 for receiving signal $y_2(k)$, a negative input, and an output for providing a signal labelled "$x_1(k)$". DAC 63 has an input connected to the output of summing device 73 for receiving signal $x_1(k)$, and an output connected to interface 40. ADC 64 has an input connected to interface 41, and an output for providing a signal labelled "$y_1(k)$". Electrical echo canceller 65 includes an AFIR filter 74, and a summing device 75. Summing device 75 has a positive input connected to the output of ADC 64 for receiving signal $y_1(k)$, a negative input, and an output for providing a signal labelled "$x_2(k)$". DAC 66 has an input connected to the output of summing device 75, and an output. Amplifier 67 has an input connected to the output of DAC 66, and an output connected to loudspeaker 22. Note that the blocks in FIG. 3 encompass conventional features associated with telephone operation which are not specifically identified, such as pulse-code-modulation (PCM), 60 hertz power supply line filtering, and the like.

In electrical echo canceller 65, AFIR filter 74 has a signal input for receiving signal $x_1(k)$, a feedback input connected to the output of summing device 75, and an output connected to a negative input of summing device 75. Since the output of summing device 75 is an error signal, the second input of AFIR filter 74 is designated "$e_1(k)$", but $e_1(k)$ is the same as signal $x_2(k)$. AFIR filter 74 is a conventional tapped-delay-line FIR filter using the least-mean-square technique for coefficient adjustment and its operation is well known to the art.

In acoustic echo canceller 62, delay buffer 71 is a variable delay buffer which has a signal input for receiving signal $x_2(k)$, a delay input for receiving a value labelled "DELAY", and an output. AFIR filter 72 has a signal input connected to the output of delay buffer 71, a feedback input connected to the output of summing device 62, a number of taps input for receiving a value labelled "N", and an output connected to a negative input of summing device 73. Since the output of summing device 73 is an error signal, the second input of AFIR filter 74 is designated "$e_2(k)$", but is the same as signal $x_1(k)$.

To accommodate large rooms with poor acoustics, it is desirable for AFIR filter 72 to have a large number of coefficients. However, increasing the number of coefficients for large room sizes also increases the noise for small rooms with good acoustics. This increased noise may be seen by describing the operation of AFIR filter 72 mathematically. The output of echo canceller 62 at the output terminal of summing device 73 is expressed as $$e_2(k) = y_2(k) - H^T(k)X_2(k) \quad [1]$$

where H(k) is an N-element vector consisting of AFIR filter 72 coefficients expressed at time k as $$H(k) = [h_0(k), h_1(k), \ldots, h_{N-1}(k)]^T \quad [2]$$

where T denotes the matrix transpose, and where $X_2(k)$ is an N-element input data vector expressed as $$X_2(k) = [x_2(k), x_2(k-1), \ldots, x_2(k-N+1)]^T \quad [3]$$

Coefficients $h_j(k)$ for $j=0$ to $N-1$ are updated every sample period to minimize error signal $e_2(k)$ according to the least-mean-squares (LMS) method. The LMS method, which is one implementation of the steepest descent method, updates coefficient vector H(k) at each sample point k according to the following relation:

$$H(k) = H(k-1) + Ke_2(k)X_2(k) \quad [4]$$

where K denotes the loop gain factor (convergence parameter). The LMS adaptive method forces the error term to zero. When the error terms are minimized, the adaptive filter impulse response is said to have converged to the impulse response of the echo path.

AFIR filter 72 continuously finds a Wiener solution in the time domain recursively as expressed below:

$$\underline{W} = (R_{XY}(k)) \cdot (R_{XX}(k))^{-1} \quad [5]$$

where W represents the coefficient vector, $R_{XY}(k)$ represents the cross-correlation vector between the received signal x(k) and the echo signal y(k), and $R_{XX}(k)$ represents the autocorrelation matrix of the received signal x(k) at time k. To obtain an optimum W, the inverse matrix $(R_{XX}(k))^{-1}$ must be computed. If the number of coefficients is too large in relation to the time the echo dies out, then $R_{XX}^{-1}$ is a sparse matrix with many zeros or with small numbers located on the diagonal. Such a matrix cannot be inverted in a strict mathematical sense. Thus, inaccuracies in reconstructing the echo-free signal result, causing increased noise.

In signal processing system 23, DELAY is set to N1, where N1 represents the number of samples between an acoustic signal and the first attack in which the echo of the acoustic signal exceeds a first threshold of $-TH1$ as previously illustrated in FIG. 2. N is set to (N2−N1), where N2 represents the number of samples it takes for the echoes of an acoustic signal to fall below a second threshold $-TH2$ as previously illustrated in FIG. 2.

The values DELAY and N are determined by measuring the acoustical properties of the room at initialization. One possible initialization sequence proceeds as follows. First, signal processing system 23 provides a unit pulse to loudspeaker 22 via DAC 66. Second, the output clock for DAC 66 is synchronized to the input clock for ADC 61. Third, signal processing system 23 collects a predetermined number of samples with which to measure the acoustical echo characteristics. This predetermined number should be large enough to accommodate any room size. After the samples are collected, signal processing system 23 measures the number of samples between the start of the acoustical signal and the first attack (N1), and provides this value as DELAY to delay buffer 73. Signal processing system Z3 also measures the number of samples between the first attack and the sample in which the echo falls below $-TH2$ (N2−N1) and provides this value as N to AFIR filter 74. At that point, normal operation is possible.

Signal processing system 23 may be implemented using conventional integrated circuits such as the Motorola DSP56001 General-Purpose Digital Signal Processor and conventional ADCs and DACs. Each of AFIR filters 70 and 74 may be implemented by conventional integrated circuits such as by using one or more Motorola DSP56200 Cascadable-Adaptive Finite-Impulse-Response (CAFIR) Digital Filter Chips. A software routine running on the general-purpose digital signal processor performs the initialization. For example, TABLE I represents a DSP56001 instruction-set sequence which collects 8000 samples:

TABLE I

| | | | |
|---|---|---|---|
| init | equ | $0040 | ; initialization routine |
| ipr | equ | $FFFF | ; interrupt priority register |
| cra | equ | $FFEC | ; ssi control register a |
| crb | equ | $FFED | ; ssi control register b |
| pcc | equ | $FFET | ; port c control register |
| ssi | equ | $FFEF | ; ssi data register |
| | org | p:$0000 | ; reset vector |
| | jmp | init | |
| | org | p:$000C | |
| | jsr | main | ; ssi receive interrupt vector |
| | org | p:init | |
| | ori | #$03,mr | ; disable all interrupts |
| | movep | #$3000,x:ipr | ; set ssi interrupt priority |
| | movep | #$0x:pcc | ; clear PCC |
| | movep | #$4000,x:cra | ; 16-bit 1-word frame |
| | movep | #$B200,x:crb | ; RTI, RE, TE, Wordwide |
| | movep | #$1FEx:pcc | ; reset the SSI port |
| | move | #0,r1 | ; data pointer |
| | move | #$7FFFFF,a1 | ; maximum value for impulse |
| | andi | #$FC,mr | ; enable SSI interrupt |
| idle | jmp | idle | ; wait for interrupt |
| main | move | r1b | ; check for last data |
| | move | #8000,x0 | ; until 8000 samples |
| | cmp | x0,b | ; is it done? |
| | jeq | done | ; if yes, don't collect any more |
| | movep | a1,x:ssi | ; send to loudspeaker through D/A |
| | movep | x:ssi,y:(r1)+ | ; get microphone signal |
| | clr | a | ; make it zero for output |
| done | rti | | ; return from interrupt |
| | end | | |

Once the 8000 samples are collected, software can determine the values for DELAY and N. However, it should be apparent that other routines are possible and that signal processing system 23 may be implemented with different combinations of hardware and software.

Figure 4:
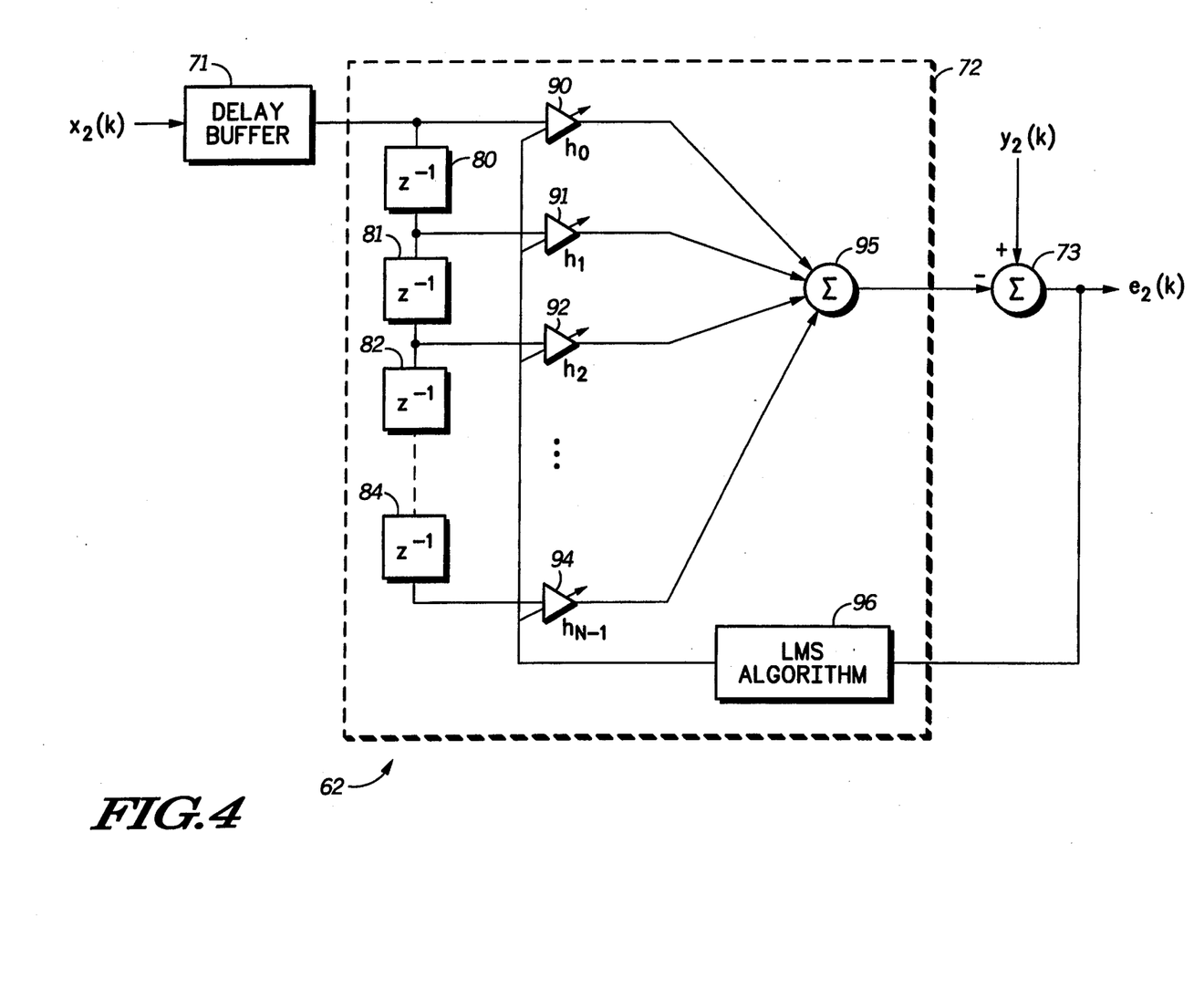
FIG. 4 illustrates a detailed block diagram of a digital signal processing representation of the acoustic echo canceller of FIG. 3.

FIG. 4 illustrates a detailed block diagram of a digital signal processing representation of acoustic echo canceller 62 of FIG. 3. Delay buffer 71 delays signal $x_2(k)$ by a number of sample periods equal to DELAY and corresponding to the measured first attack. The output of delay buffer 71 is passed sequentially through delay elements in AFIR filter 72 labelled "$z^{-1}$". FIG. 4 illustrates four representative delay elements 80, 81, 82, and 83. Delay element 80 has an input for receiving the output of delay buffer 71, and an output; delay element 81 has an input for receiving the output of delay element 80, and an output; and so on. AFIR filter 72 includes a total of (N−1) delay elements but additional delay elements are not shown in FIG. 4.

AFIR filter 72 also includes a total of N variable multipliers which multiply samples having varying delays by respective filter coefficients. A first variable multiplier 90 multiplies the output of delay buffer 71 by a coefficient labelled "$h_0$"; a second variable multiplier 91 multiplies the output of delay element 80 by a coefficient labelled "$h_1$"; a third variable multiplier 92 multiplies the output of delay element 81 by a coefficient labelled "$h_2$"; and so on until a last delay element 94 multiplies the output of delay element 84 by a coefficient labelled "$h_{N-1}$". The outputs of each variable multiplier are summed at positive input terminals of a summing device 95. Summing device 95 has an output connected to a subtract input of summing device 73. The output of summing device 95 is thus subtracted from signal $y_2(k)$ to provide error signal $e_2(k)$. A least-mean-squared (LMS) predictor 96 receives signal $e_2(k)$ and adjusts each filter coefficient $h_j$ of respective variable multipliers in order to minimize $e_2(k)$.

Figure 5:
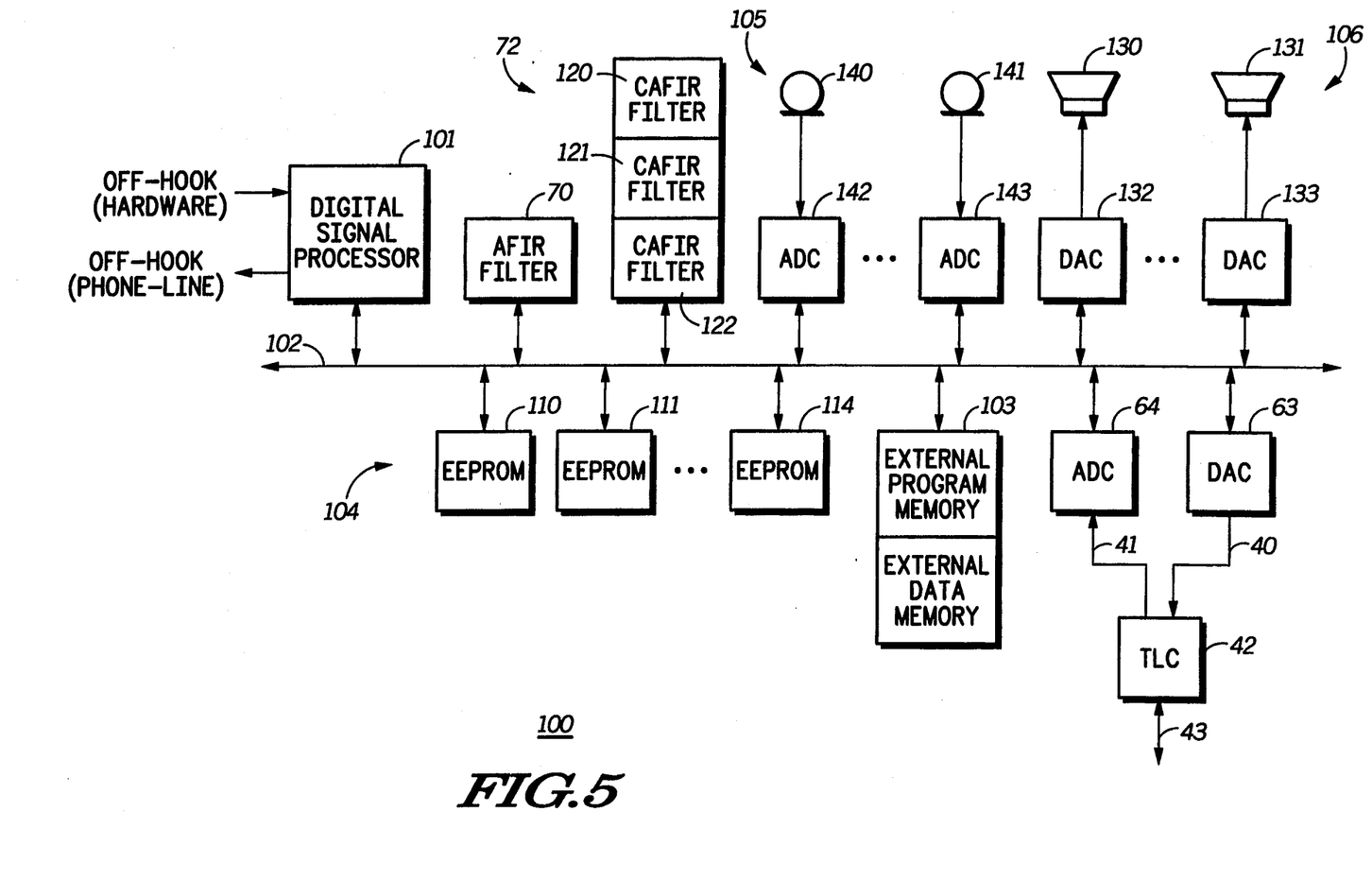
FIG. 5 illustrates in block diagram form a data processing system for implementing the signal processing system of FIG. 1 in a multi-microphone environment.

The initialization sequence used to determine the initial value of coefficients $h_j$ described above is usually adequate for simpler speakerphone systems. However, the initialization sequence for more-complex systems such as teleconferencing systems is more complex. The conventional approach uses a sequence of pink noise utilized at startup and may last in the range of 5-20 seconds. This sequence is annoying to the user and a new teleconferencing initialization system is needed. To that end, FIG. 5 illustrates in block diagram form a data processing system 100 for implementing the signal processing system of FIG. 2 in a multi-microphone environment.

Elements in common with signal processing system 23 retain their previous reference numbers. Data processing system 100 includes generally a general-purpose digital signal processor 101, a communications bus 102, a memory 103, a nonvolatile memory portion 104, a microphone portion 105, and a loudspeaker portion 106. Digital signal processor 101 has an input for receiving an "OFF-HOOK" indication from speakerphone hardware (not shown), and an output for providing the OFF-HOOK indication to the phone line. Digital signal processor 101 is connected to communications bus 102 for conducting address, data, and control signals to and from various devices in data processing system 100. One such device is memory 103, which includes an external program memory and an external data memory. Nonvolatile memory portion 104 includes at least one electrically-erasable programmable read only memory (EEPROM) 110. Optionally, nonvolatile memory portion 104 includes additional EEPROMs corresponding to the number of microphones in the system such as illustrative EEPROMs 111 and 114.

Electrical echo cancellation is performed by an AFIR filter 70 connected to communications bus 102. However, acoustic echo cancellation requires an AFIR filter 72 which has many taps to accommodate the speakerphone. Thus, AFIR filter 72 actually includes three cascadable AFIR (CAFIR) filters such as the DSP56200. It should be apparent that while data processing system 100 performs echo cancellation with separate integrated circuits to implement the AFIR filters, in other embodiments the signal processing functions may be performed entirely by a filter algorithm running on a general purpose DSP, or a combination of the two.

A teleconferencing system typically includes multiple speakers and multiple microphones. Thus, FIG. 5 illustrates microphone portion 105 as including a variable number of microphones and corresponding ADCs. For example, a first microphone 140 is connected to an input of an ADC 142, the output of which is connected to communications bus 102. A second microphone 141 is connected to an input of an ADC 143, the output of which is connected to communications bus 102. Likewise, FIG. 5 illustrates loudspeaker portion 106 as including a variable number of loudspeakers and corresponding DACs. For example, a first loudspeaker 130 is connected to an output of a DAC 132, an input of which is connected to communications bus 102. A second loudspeaker 131 is connected to an output of a DAC 133, an input of which is connected to communications bus 102.

Data processing system 100 avoids the annoying 5-20 seconds of noise encountered on each initialization of known teleconferencing systems. First, upon first initializing the system after set up in a new room, DSP 101 performs a conventional pink-noise initialization, measuring the echo generated thereby with the corresponding microphone. However, the filter coefficient values are then saved to EEPROM 110. Upon detection of OFF-HOOK (HARDWARE), DSP 101 transfers the filter coefficient values stored in EEPROM 110 to AFIR filter 72. After the values are transferred, DSP 101 activates the OFF-HOOK (PHONE LINE) signal to trigger the telephone line relay. The delay introduced during the coefficient loading is too small to be noticed by the user. For example, loading coefficients into a large, 4000-tap AFIR filter having 24-bit coefficients and a 250 nanosecond access time requires less than 10 milliseconds. However, DSP 101 must sample the input port by which it receives the OFF-HOOK (HARDWARE) signal often enough so that the user will not notice the delay, for example at least once every 100 ms.

During normal operation, the coefficient values are constantly updated. At the end of the telephone call, the coefficient values are transferred from CAFIR filters 120-122 to EEPROM 110 in response to an inactivation of OFF-HOOK (HARDWARE). When the transfer is complete, DSP 101 inactivates OFF-HOOK (PHONE LINE).

A second sequence is particularly useful for multiple-microphone systems. Upon first initializing the system after set up in a new room, DSP 101 performs a pink-noise initialization for each microphone. The filter coefficient values for each microphone are then transferred to additional EEPROMs such as EEPROMS 111 and 114. Filter coefficient values are transferred from an EEPROM to CAFIR filters 120-122 as above in response to OFF-HOOK (HARDWARE). However, software running on DSP 101 implements a system known as adaptive beamforming to determine which microphone to activate. Adaptive beamforming estimates power received from each microphone and selects the microphone having the highest power. When the adaptive beamforming software selects a different microphone, coefficients for the old microphone are dynamically stored in the corresponding EEPROM and replaced by coefficient values from the EEPROM corresponding to the new microphone. A typical replacement takes less than 50 milliseconds.

Thus, a signal processing system for a speakerphone or the like has been described. The signal processing system reduces noise during normal operation by eliminating excess AFIR filter taps unneeded by the particular room environment. First, the echo canceller delays a signal input to an acoustic echo-cancellation AFIR filter for a length of time equal to the number of sample periods between a test signal and a first attack thereof. Second, the echo canceller adaptively adjusts the number of AFIR filter taps used, to equal the number of sample periods between the first attack and a time in which the expected power in the echo falls below a predetermined threshold.

The signal processing system also reduces initialization noise. First, AFIR filter coefficients are measured in an initialization sequence. These coefficients are stored in a nonvolatile memory and transferred to the AFIR filter in response to an off-hook indication. During operation, the filter coefficients are continuously updated. The updated coefficients are transferred back to the nonvolatile memory in response to an on-hook indication. Second, several nonvolatile memories are used to store corresponding AFIR filter coefficients corresponding to different microphones in a multi-microphone system. During operation, the coefficients corresponding to a new microphone are substituted dynamically for coefficients of an old microphone, using a power-estimating algorithm such as adaptive beamforming. Thus, the annoying initialization noise normally encountered at the beginning of each new call is avoided.

While the invention has been described in the context of a preferred embodiment, it will be apparent to those skilled in the art that the present invention may be modified in numerous ways and may assume many embodiments other than that specifically set out and described above. For example, the signal processing system and noise reduction may be implemented in hardware, in software, or in some combination of the two. Also the first attack and attenuated echo thresholds may be the same or different. Accordingly, it is intended by the appended claims to cover all modifications of the invention which fall within the true spirit and scope of the invention.

We claim:

1. An apparatus for noise reduction for full-duplex communication, comprising:
   a summing device having a positive input for receiving a microphone input signal, a negative input, and an output for providing a first output signal;
   a delay buffer having an input terminal for receiving a digital receive path signal, and an output terminal for providing a second output signal; and
   an adaptive finite impulse response (AFIR) filter having a signal input terminal coupled to said output terminal of said delay buffer, a feedback input terminal coupled to said output terminal of said summing device, and an output terminal coupled to said negative input of said summing device for providing a third output signal;
   said delay buffer delaying said digital receive path signal by a first predetermined number of sample periods, said first predetermined number of sample periods equal to a number of sample periods from a test loudspeaker output signal to a first time when a power of said microphone input signal exceeds a first predetermined threshold;
   said AFIR filter having a number of coefficients equal to a number of sample periods between said first time and a second time at which an expected power of said microphone input signal drops below a second predetermined threshold;
   said AFIR filter having a plurality of contiguous memory locations for storing successive samples of said second output signal, said AFIR filter multiplying said number of coefficients by corresponding ones of said successive samples of said second output signal to obtain said third output signal.

2. The apparatus of claim 1 wherein said number of coefficients of said AFIR filter are updated using a least-mean-squares algorithm.

3. The apparatus of claim 1 wherein said first predetermined threshold equals said second predetermined threshold.

4. An apparatus for noise reduction for full-duplex communication, comprising:
   a communications bus;
   a nonvolatile memory coupled to said communications bus;
   an adaptive finite impulse response (AFIR) filter having an input coupled to said communications bus for receiving initial values of a predetermined number of AFIR filter coefficients, said AFIR filter applying said predetermined number of AFIR filter coefficients to a corresponding predetermined number of samples of an input signal to provide an echo-cancelled output signal, said AFIR filter continuously updating said predetermined number of AFIR filter coefficients while said AFIR filter applies said predetermined number of AFIR filter coefficients using a least-mean-squares algorithm to provide updated values of said predetermined number of AFIR filter coefficients; and
   a data processor coupled to said communications bus, for transferring said initial values of said predetermined number of AFIR filter coefficients from said nonvolatile memory to said AFIR filter in response to an off-hook input signal, and for transferring said updated values of said AFIR filter coefficients from said AFIR filter to said nonvolatile memory in response to a deactivation of said off-hook input signal.

5. The apparatus of claim 4 wherein said data processor further provides an off-hook output signal to a telephone transmission line coupler to trigger a telephone line relay after transferring said initial values of said predetermined number of AFIR filter coefficients from said nonvolatile memory to said AFIR filter.

6. An apparatus for noise reduction for full-duplex communication, comprising:
   a plurality of microphones;
   a plurality of analog-to-digital converter means coupled to corresponding ones of said plurality of microphones and to a communications bus, for sampling audio input signals from said corresponding ones of said plurality of microphones;
   a nonvolatile memory coupled to said communications bus including a plurality of nonvolatile memory portions corresponding to each of said plurality of microphones;
   an adaptive finite impulse response (AFIR) filter having an input coupled to said communications bus for receiving initial values of a predetermined number of AFIR filter coefficients, said AFIR filter applying said predetermined number of AFIR filter coefficients to a corresponding predetermined number of samples of an input signal to provide an echo-cancelled output signal, said AFIR filter continuously updating said predetermined number of AFIR filter coefficients while said AFIR filter applies said predetermined number of AFIR filter coefficients using a least-mean-squares algorithm to provide updated values of said predetermined number of AFIR filter coefficients; and a data processor coupled to said communications bus, for transferring said initial values of said predetermined number of AFIR filter coefficients, from a portion of said nonvolatile memory to said AFIR filter in response to an off-hook input signal, wherein said data processor further continuously determines an active one of said plurality of microphones and transfers said initial values of said predetermined number of AFIR filter coefficients from a corresponding one of said plurality of nonvolatile memory portions to said AFIR filter in response to said data processor determining a different active one of said plurality of microphones.

7. A data processing system for full-duplex communication comprising:
- a first microphone;
- a first analog-to-digital converter (ADC) having an input coupled to said first microphone, and an output coupled to a communication bus;
- a second microphone;
- a second ADC having an input coupled to said second microphone, and an output coupled to said communication bus;
- a first nonvolatile memory coupled to said communication bus and corresponding to said first microphone;
- a second nonvolatile memory coupled to said communication bus and corresponding to said second microphone;
- an acoustic echo canceller including an adaptive finite impulse response (AFIR) filter, said AFIR filter having an input coupled to said communication bus for receiving initial values of a plurality of coefficients therefrom, said AFIR filter applying said plurality of coefficients to a corresponding number of a plurality of samples of an input signal received from a selected one of said first and second microphones to provide an echo-cancelled output signal, said AFIR filter continuously updating said plurality of coefficients while said selected one of said first and second microphones is active, using a least-mean-squares algorithm to provide updated values of said plurality of coefficients; and
- a data processor coupled to said communication bus, for selecting one of said first and second microphones, and for transferring said initial values of said plurality of coefficients from one of said first and second nonvolatile memories corresponding to said selected one of said first and second microphones, to said AFIR filter, in response to said data processor selecting one of said first and second microphones;
- wherein said data processor further transfers said updated values of said plurality of coefficients from said AFIR filter to one of said first and second nonvolatile memories corresponding to a deselected one of said first and second microphones.

8. The data processing system of claim 7 wherein each of said first and second nonvolatile memories comprises an electrically erasable programmable read only memory (EEPROM).

9. A method for noise reduction for full-duplex communication, comprising the steps of:
- detecting an off-hook indication from a full-duplex speakerphone;
- transferring initial values of a plurality of adaptive finite impulse response (AFIR) filter coefficients from a nonvolatile memory to an AFIR filter;
- providing an off-hook indication to a telephone line;
- filtering an acoustic input signal, received from a microphone of said full-duplex speakerphone, in said AFIR filter;
- continuously updating the values of said plurality of AFIR filter coefficients to provide updated values of said plurality of AFIR filter coefficients while performing said step of filtering;
- detecting an on-hook indication from the full-duplex speakerphone;
- transferring said updated values of said plurality of AFIR filter coefficients from said AFIR filter to said nonvolatile memory; and
- providing an on-hook indication to said telephone line.

10. The method of claim 9 wherein the step of updating the values of said plurality of AFIR filter coefficients is performed according to a predetermined algorithm.

11. The method of claim 10 wherein said step of updating the values of said plurality of AFIR filter coefficients further comprises the step of updating said plurality of AFIR filter coefficients according to a least-mean-squares (LMS) algorithm during said step of filtering.

12. A method for noise reduction for full-duplex communication, comprising the steps of:
- estimating a power of both a first acoustic input signal received from a first microphone and a second acoustic input signal received from a second microphone;
- selecting one of said first and second microphones with a greater of the two estimated powers and deselecting another one of said first and second microphones with a lower of the two estimated powers;
- transferring current values of a plurality of adaptive finite impulse response (AFIR) filter coefficients from an AFIR filter to one of first and second nonvolatile memories corresponding to said deselected one of said first and second microphones;
- transferring initial values of said plurality of AFIR filter coefficients from one of said first and second nonvolatile memories corresponding to said selected one of said first and second microphones, to said AFIR filter;
- filtering the acoustic input signal from said selected one of said first and second microphones in said AFIR filter; and
- continuously updating the initial values of said plurality of AFIR filter coefficients according to a predetermined algorithm to provide updated values of the initial values of said plurality of AFIR filter coefficients while said selected one of said first and second microphones remains selected.

* * * * *